(12) United States Patent
Hawwa et al.

(10) Patent No.: US 6,310,746 B1
(45) Date of Patent: Oct. 30, 2001

(54) PIEZOELECTRIC VIBRATION DAMPING FOR DISK DRIVES

(75) Inventors: Muhammad A. Hawwa; Jamshid Bozorgi, both of Fremont, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/338,836

(22) Filed: Jun. 23, 1999

(51) Int. Cl.[7] ................................................. G11B 5/012
(52) U.S. Cl. ..................... 360/97.01; 360/264; 360/244.2
(58) Field of Search ............................... 360/244.2, 264, 360/97.01, 97.02

(56) References Cited

U.S. PATENT DOCUMENTS

| | | |
|---|---|---|
| D. 404,100 | 1/1999 | Lazarus et al. . |
| 4,080,636 * | 3/1978 | Ravizza ................................. 360/77 |
| 5,235,472 | 8/1993 | Smith . |
| 5,315,203 * | 5/1994 | Bicos ................................... 310/326 |
| 5,424,596 * | 6/1995 | Mendenhall ......................... 310/328 |
| 5,558,477 * | 9/1996 | Browning ............................ 408/143 |
| 5,606,477 | 2/1997 | Erpelding et al. . |
| 5,796,553 | 8/1998 | Tangren . |
| 5,857,694 | 1/1999 | Lazarus et al. . |
| 5,862,015 * | 1/1999 | Evans .................................. 360/104 |
| 6,100,623 * | 8/2000 | Huang ................................. 310/317 |

OTHER PUBLICATIONS

IBM TDB; vol. 34, No. 4B, pp. 53–54, (no author); Piezo-electric Modal Sensor/Actuator Devices for DASD Active Damping Vibration Control, Sep. 1991.*

* cited by examiner

*Primary Examiner*—A. J. Heinz
(74) *Attorney, Agent, or Firm*—Garr & Ferrell, LLP

(57) ABSTRACT

The present invention provides passive and active damping systems for reducing or substantially eliminating undesirable vibrations from components of data storage and retrieval systems. The passive and active damping systems incorporate piezoelectric materials, and make use of an advantageous property of these materials, namely the ability to convert mechanical strains into electric potentials and vice versa. The passive systems of the present invention dissipate vibrational energy through an electrical shunt circuit. The active systems seek to cancel an existing vibration in a component by generating and applying an additional vibration to the same component, where the applied vibration is out of phase with the existing vibration and the two vibrations tend to add destructively. Active systems, in certain circumstances, may also be able to anticipate predictable vibrations and proactively cancel them, rather than merely reacting to vibrations after they arise.

11 Claims, 5 Drawing Sheets

PIEZOELECTRIC VIBRATION DAMPING FOR DISK DRIVES

BACKGROUND OF THE INVENTION

This invention relates generally to magnetic disk data storage systems, and more particularly to the use of piezoelectric materials to damp vibrations within the same.

Magnetic disk drives are used to store and retrieve data for digital electronic apparatuses such as computers. In FIGS. 1A and 1B, a magnetic disk data storage system of the prior art includes a sealed enclosure 12, a spindle motor 14, a magnetic medium or disk 16, supported for rotation by a drive spindle Si of the spindle motor 14, a voice-coil actuator 18 and an arm 20 attached to an actuator spindle S2 of voice-coil actuator 18. A read/write head support system consists of a suspension 22 coupled at one end to the arm 20, and at its other end to a read/write head 24.

The read/write head 24 typically includes an inductive write element with a sensor read element. As the motor 14 rotates the magnetic disk 16, as indicated by the arrow R, an air bearing is formed under the read/write head 24 causing it to lift slightly off of the surface of the magnetic disk 16, or, as it is termed in the art, to "fly" above the magnetic disk 16.

Discrete units of magnetic data, known as "bits," are typically arranged sequentially in multiple concentric rings, or "tracks," on the surface of the magnetic medium. Data can be written to and/or read from essentially any portion of the magnetic disk 16 as the voice-coil actuator 18 causes the read/write head 24 to pivot in a short arc, as indicated by the arrows P, over the surface of the spinning magnetic disk 16. The design and manufacture of magnetic disk data storage systems is well known to those skilled in the art.

Fundamentally, magnetic disk drives are electro-mechanical devices incorporating rapidly moving or spinning components. The different motions within a drive may induce various components to vibrate. Vibrations can be deleterious to the performance of a disk drive and may increase data retrieval times, reduce accuracy, reduce total storage capacity, and lead to possible catastrophic failure. Therefore, controlling and minimizing vibrations have become critical to the magnetic disk drive industry.

FIG. 2 is a perspective view of a Voice-Coil Motor (VCM) 30 and Head Stack Assembly (HSA) 40 showing commonly used viscoelastic dampers according to the prior art. The VCM consists, in part, of two substantially parallel magnetic plates 32 and 32'. A prior art viscoelastic VCM damper 34 is usually attached to the exterior surface of magnetic plate 32.

The Head Stack Assembly 40 consists, in part, of an actuator arm, 20, a suspension 22, and a read/write head 24. A prior art viscoelastic actuator arm damper 44 is normally attached to the actuator arm 20, and a prior art viscoelastic suspension damper 46 is attached to the suspension 22. Together, the VCM 30 and the HSA 40 control the positioning of the read/write head 24 relative to the magnetic storage medium. The disk drive control logic directs the movement of the read/write head 24 through a preamplifier 38 and a flexible cable 42. A prior art viscoelastic flexible cable damper 48 is attached to the flexible cable 42.

One of the key areas for vibration control in a disk drive 10 is the suspension 22 that holds the read/write head 24 out over the surface of the rapidly spinning magnetic disk 16. One possible vibrational mode for the suspension 22 is a bending mode in which the suspension 22 flexes up and down bringing the read/write head 24 alternately closer and further away from the magnetic disk 16. Such a vibration is undesirable for at least three reasons. Firstly, as the read/write head 24 moves further away from the surface of the magnetic disk 16, its ability to read the magnetic information on the magnetic disk 16 diminishes rapidly. Secondly, as the read/write head 24 moves closer to the magnetic disk 16 the likelihood of the read/write head 24 inadvertently touching the surface of the magnetic disk 16 increases. Contact between the read/write head 24 and the magnetic disk 16 can create wear debris, and in some instances even lead to a catastrophic failure of the device frequently referred to as "head crash." As designers build drives with ever lower "fly heights," preventing unwanted contact between the read/write head 24 and the magnetic disk 16 becomes increasingly difficult and controlling vibrations becomes increasingly important. Thirdly, vibration of the suspension 22 causes modulation in the signal being read from or written to the magnetic disk 16 by the read/write head 24.

Other vibrational modes of the suspension 22 can include torsional modes and side-to-side bending, sometimes referred to as sway. These vibrational modes can also create modulations in the signal being read from or written to the magnetic disk 16. Side-to-side bending of the suspension 22 while writing to the magnetic disk 16 may also cause broadening of the trackwidth. Broadening the trackwidth may cause adjacent tracks to overlap, resulting in a loss of data. However, allowing extra space between tracks decreases the number of tracks that can be written on the surface of the magnetic disk 16 and therefore reduces its total storage capacity. Therefore, reducing vibrations could allow tracks to be placed closer together, leading to higher storage capacities.

Another problem associated with vibrations of the suspension 22 is the time it takes for the read/write head 24 to stabilize its position over a particular track after being moved between tracks, sometimes referred to as settling time. Delays in stabilization over a desired track may increase the delay before data can be accessed or written. In other words, damping the vibrations of suspension 22 will improve its dynamic characteristics, thereby enhancing disk drive overall access time.

Vibrations in other components connected to the suspension 22 also may contribute to unwanted vibrations in the suspension 22. Therefore, it may be desirable to damp the vibrations of components such an actuator arm 20, a Voice-Coil Motor (VCM) 30, and a flexible cable 42. Damping the vibrations of components, generally may be desirable for several additional reasons. Vibrations in a mechanical device may reduce the device's overall longevity by loosening connectors, seals, and filters, and creating excessive wear in moving parts. Vibrations can also lead to frayed wires, metal fatigue, and particle generation.

Vibration control in disk drives has commonly been achieved through the use of passive damping. In the prior art, passive damping has been accomplished by attaching constraining viscoelastic materials to components that are known to vibrate. Viscoelastic materials damp vibrations by creating passive resistance to bending and twisting motions. There are drawbacks, however, to the use of viscoelastic vibration dampers. One problem is that viscoelastic materials are frequently polymeric and tend to degrade as they age, loosing their damping effectiveness while outgassing and shedding particles. Outgassing and particle contamination may pollute the surface of the magnetic disk 16 and lead to problems such as "head crash" or the inability of the read/write head 24 to lift off of the surface of the magnetic disk 16 and "fly." Additionally, viscoelastic materials typically loose damping efficiency with increasing temperature. Since the temperature within the disk drive 10 typically increases as it operates, vibrations of components within the disk drive 10 may worsen as the drive is used.

Accordingly, what is desired is a damping system for more efficiently reducing vibrations of components of data storage and retrieval systems. Also, a damping system is desired that can maintain its damping efficiency over a longer period of time, and over a greater range of temperatures, with less particle generation and outgassing than may be found in the prior art. A damping system is further desired that can be tunable to provide damping only to vibrations within a selected range of frequencies.

SUMMARY OF THE INVENTION

The present invention provides for the use of piezoelectric materials for passively or actively damping vibrations of components of data storage and retrieval systems including, but not limited to, both magnetic disk drives and optical disk drives.

According to an embodiment of the present invention, a vibration damping device for passively reducing vibrations of a component of a data storage and retrieval system comprises a piezoelectric material attached to the component and an electrical shunt circuit attached to the piezoelectric material. A vibration in the component can cause a vibration in the attached piezoelectric material. The vibration in the piezoelectric material can be thought of as an alternating mechanical strain. A mechanical strain in a piezoelectric material will create an electric voltage across the piezoelectric material. Therefore, inducing a vibration in the piezoelectric material can give rise to an alternating voltage across the piezoelectric material. The alternating voltage across the piezoelectric material can produce an alternating electric current in the connected shunt circuit. The shunt circuit may passively dissipate the electric current, thereby removing energy from system. In short, vibrations are damped by converting mechanical energy into electrical energy that can be later dissipated, typically as heat.

Additional embodiments include attaching piezoelectric materials to various components of a data storage and retrieval device including, but not limited to, actuator arms, slider suspensions, VCMs, etc. Further embodiments are directed towards the electrical shunt circuit which may be a single resistor, a resistor and an inductor in series, a single inductor, a RLC circuit, or one of many other types of electrical shunts well known to those skilled in the art.

A passive damping system incorporating a piezoelectric material presents several advantages. Piezoelectric materials may generate fewer particles and present less of an outgassing problem than viscoelestic materials. Piezoelectric materials also may show less degradation over time and may maintain a better damping efficiency over a wider range of temperatures than viscoelastic materials. In addition, a piezoelectric damper may be tuned to handle certain spectra of vibration frequencies.

Yet another embodiment of the present invention is directed to an active vibration damping device for reducing vibrations of a component of a data storage and retrieval system. The active damping device comprises a piezoelectric material attached to the component of the data storage and retrieval system. The device further includes a sensor for measuring vibrational characteristics, such as frequency, amplitude, and phase, of at least one vibrational mode of the component of the data storage and retrieval system. Additionally, the device comprises a controller in communication with the sensor. The controller is capable of applying an alternating electric potential to the piezoelectric material in order to induce a vibration in the piezoelectric material. Preferably, the vibration induced in the piezoelectric material induces a new vibration in the component that tends to cancel the existing vibration in the component.

An active damping system incorporating a piezoelectric material may present several advantages. In addition to the aforementioned advantages of piezoelectric materials in passive damping systems, the ability of piezoelectric materials to respond with dimensional changes to applied electric fields allows active damping systems to be created. An active damping system can induce a canceling vibration in a component that may more completely eliminate a vibration mode than would a passive damping system.

Active systems, in certain circumstances, may also be able to anticipate predictable vibrations and proactively cancel them, rather than merely reacting to vibrations after they arise. Such a system could also be configured to only operate when vibration cancellation is advantageous, thus switching off and saving energy when vibration cancellation serves no particular purpose. An advantage of such a proactive system would be faster responsiveness in certain circumstances.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 1A:
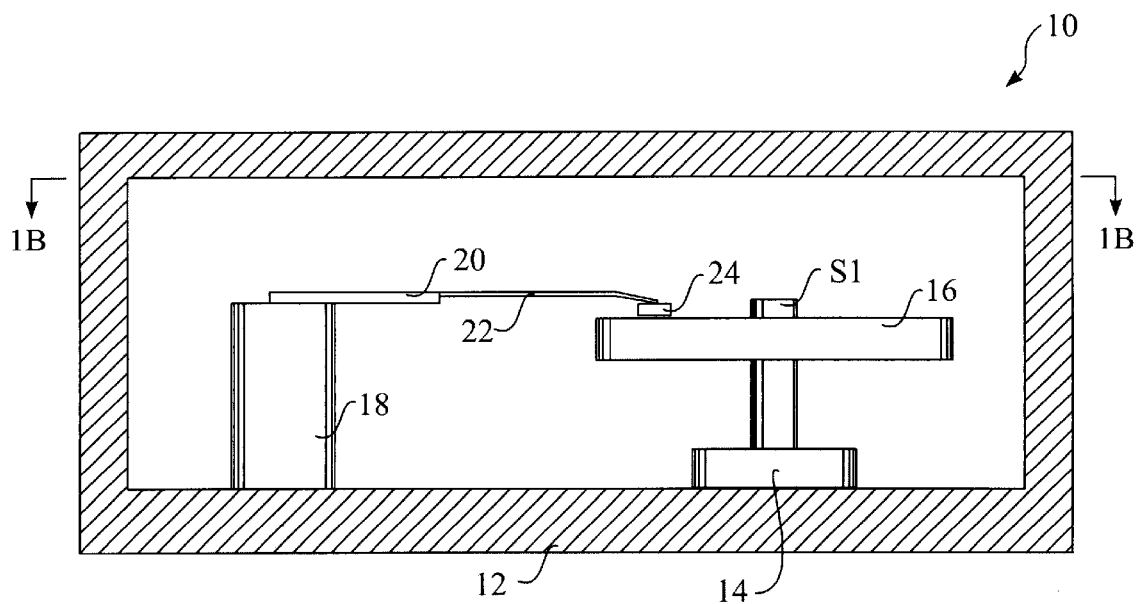
FIG. 1A is a partial cross-sectional elevation view of a magnetic data storage system.
Figure 1B:
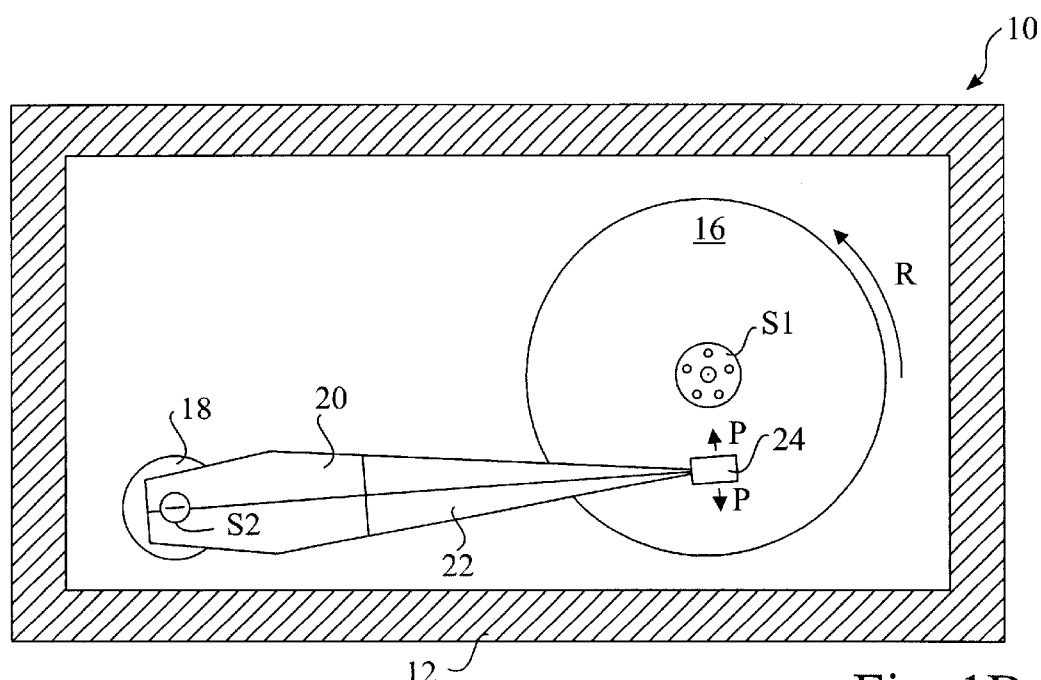
FIG. 1B is a top plan view of the magnetic data storage system taken along line 1B—1B of FIG. 1A.
Figure 2:
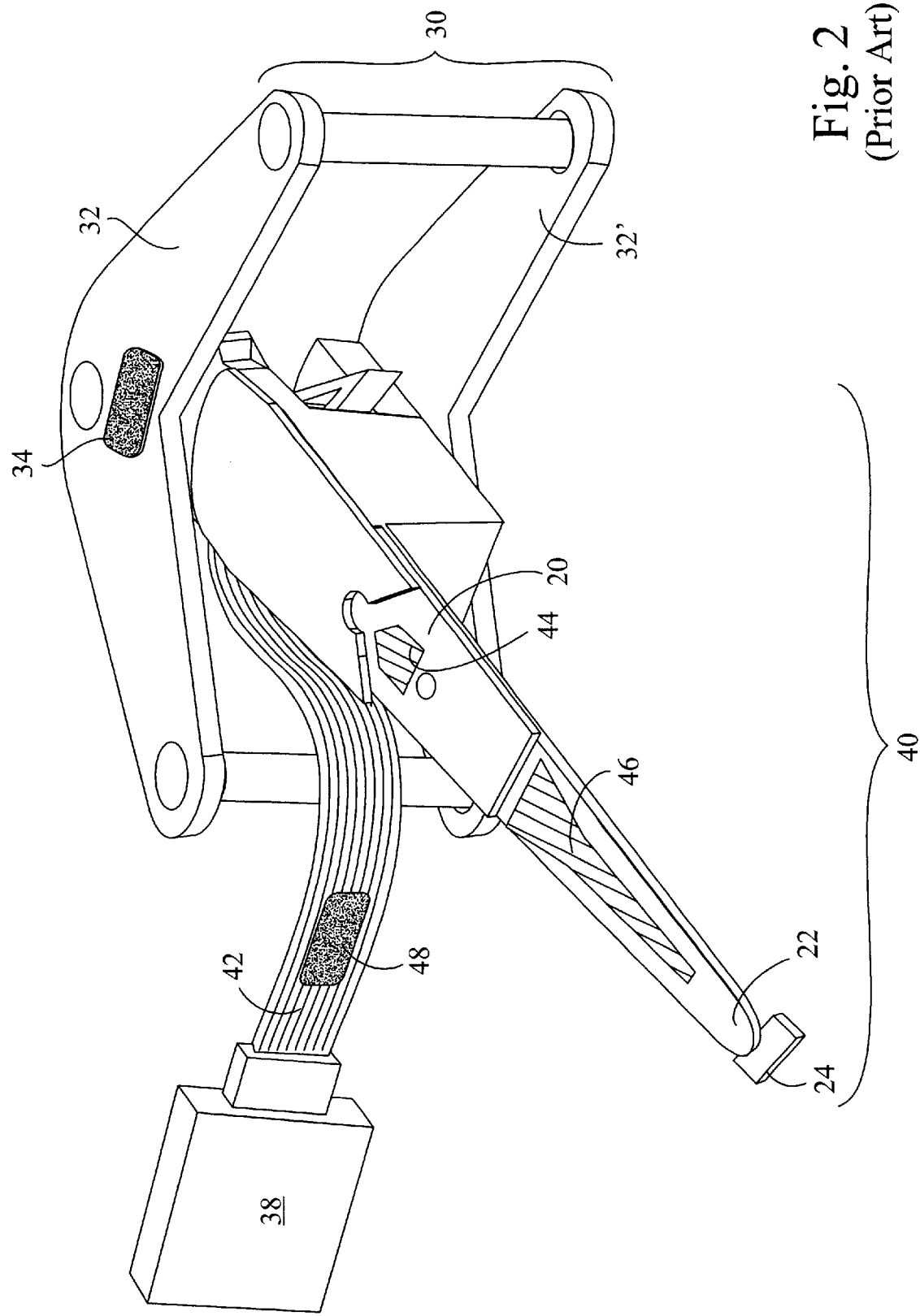
FIG. 2 is perspective view of a Voice-Coil Motor (VCM) and Head Stack Assembly (HSA) for positioning the read/write head relative to the magnetic storage medium.

FIGS. 1A, 1B, and 2 were discussed above with reference to the prior art.

Passive Damping

Component 52

Figure 3:
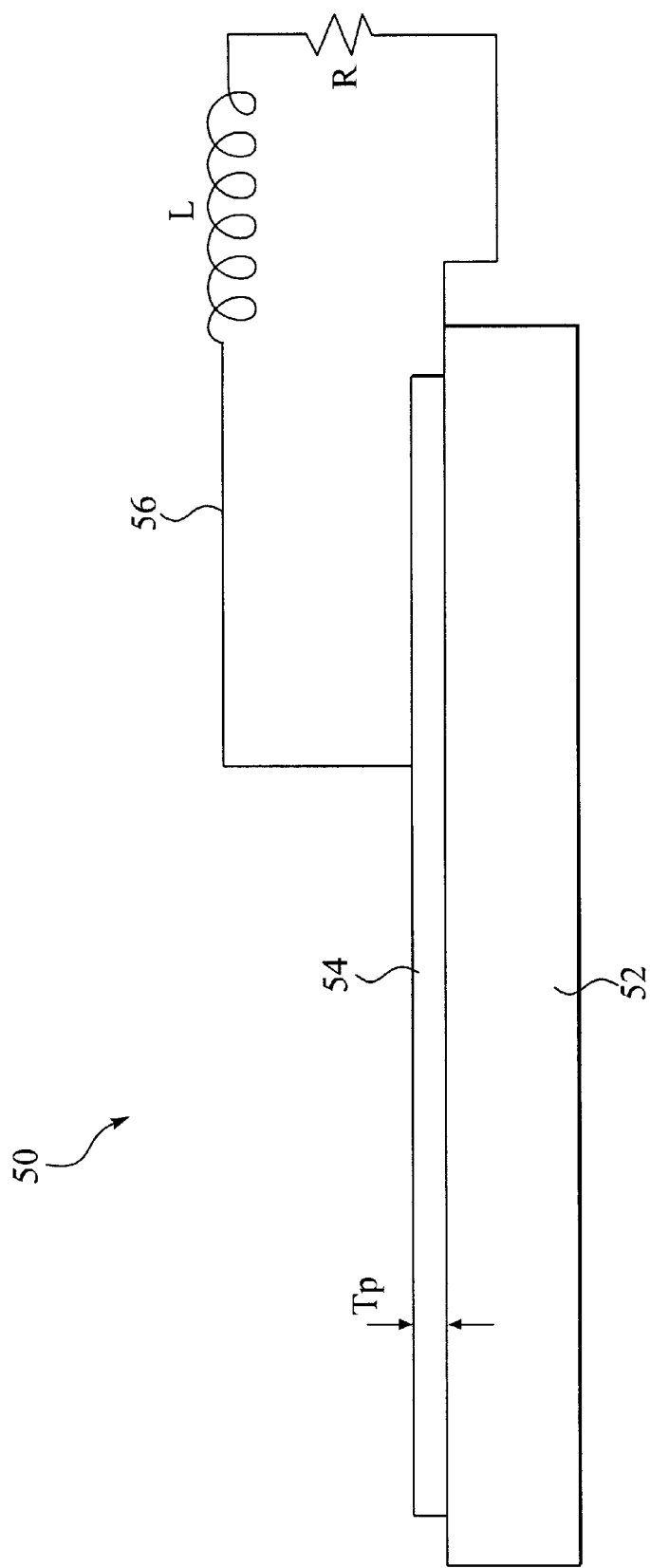
FIG. 3 is a schematic diagram of a piezoelectric passive damping concept.

FIG. 3 is a schematic diagram of a piezoelectric passive damping system 50 of the present invention comprising a component 52 of a data storage and retrieval system, a piezoelectric material 54, and a shunt circuit 56. The component 52 may be any component of the data storage and retrieval system that may experience undesirable vibrations. Such components may include, but are not limited to, Voice-Coil Motors (VCMs), suspensions, and actuator arms.

A component 52 of a data storage and retrieval system may vibrate in multiple ways, sometimes referred to as vibrational modes. For example, the suspension 22 can be thought of as an elastic beam rigidly fixed at one end and free at the other. One vibrational mode of such a fixed beam is a flexing motion whereby the free end moves alternately up and down substantially within a vertical plane. Another typical vibrational mode of the same system, one in which the motion of the beam again remains substantially in the vertical plane, would incorporate one or more nodes along the length of the suspension 22. When a vibrational mode includes a node, the node represents a location at which the vibrating object appears to be essentially stationary in space. Points on the component at equal distances on either side of the node are always moving in opposite directions but with substantially the same velocity. A vibration without nodes is sometimes called a fundamental vibration mode.

Another possible mode of vibration for the suspension 22 includes a side-to-side flexing motion, sometimes referred to as sway, analogous to the previously described up and down flexing motion, but occurring in a horizontal plane. A further vibrational mode is a torsional mode whereby the suspension 22 twists alternatingly clockwise and counterclockwise around its central axis. Different components of a data storage and retrieval system may have different constraints on their range of movements and therefore may show different vibrational modes.

Piezoelectric Material 54

The piezoelectric material 54 may take any number of forms, but preferably will cover a suitable area of the component 52 of the data storage and retrieval system to be effective. Due to limited amounts of space within many data storage and retrieval systems, the piezoelectric material 54 preferably will have a thin thickness $T_p$ in the direction substantially perpendicular to the surface of the component 52. Preferably, an analysis of the component 52, such as a finite element modeling, will reveal the most likely vibrational modes for the component 52, which will suggest both a shape for the piezoelectric material 54 and where it should be attached for optimal damping.

Piezoelectric materials offer significant advantages over viscoelastic materials for damping applications. To appreciate these advantages it is first necessary to describe the piezoelectric effect. Mechanically straining a piezoelectric material produces a dielectric polarization. Conversely, applying an electric field across a piezoelectric material produces a mechanical strain. Put more simply, a dimensional change in the material will give rise to an electric potential across the material, and applying an electric potential across the material will induce a dimensional change.

Commonly used piezoelectric ceramic materials include quartz, titanate ceramics such as barium titanate, lead titanate, and lead zirconium titanate (PZT), and cadmium sulphide. Many piezoelectric polymer materials are also known, including polyvinylidene fluoride (PVDF), copolymers of vinylidene fluoride and trifluoroethylene (VDF/TrFE), copolymers of vinylidene fluoride and tetrafluoroethylene (VDF/TeFE) or copolymers of vinylidene cyanide and vinyl acetate (VDCN/VA).

Piezoelectric materials for vibration damping applications offer several distinct advantages over viscoelastic materials. Piezoelectric materials may provide higher energy conversion efficiencies, thereby removing energy from a vibrating system more quickly. Piezoelectric dampers have been shown to operate over a broad spectrum of frequencies and are better suited to capturing low frequency vibrations. Ceramic piezoelectric materials are not adversely affected by elevated temperatures and humidity, and do not degrade, outgas, or lose effectiveness over time.

Piezoelectric material 54 may be composed of any suitable piezoelectric composition such as lead zirconium titanate (PZT). A ceramic piezoelectric material 54 may be particularly advantageous because ceramics, as compared to polymeric materials, typically show much greater resistance to environmental degredation, lower tendencies to outgas, and maintain their damping efficiencies over a wider range of temperatures. The piezoelectric material 54 may be attached to the component 52 of the data storage and retrieval system in many different ways, as long as the two are constrained to move substantially in unison.

Shunt Circuit 56

When the component 52 is bent, compressed, twisted, or otherwise strained, the piezoelectric material 54 attached to the component 52 is likewise strained. Any strain in the piezoelectric material 54 will produce an electric potential gradient across the piezoelectric material 54. The shunt circuit 56 is therefore electrically connected to piezoelectric material 54 in order to take advantage of the electric potential. Placing an electric potential across an electronic circuit will cause an electric current to flow through the circuit.

The shunt circuit 56 is intended to dissipate the electric current passing through it in response to the potential across the piezoelectric material 54. For example, a simple form of the shunt circuit 56 may include an electrical resistor. By its basic operation, an electrical resistor opposes the free flow of electric current, converting electric energy into heat. Another type of shunt circuit may be formed of an electrical inductor. An inductor uses an electric current passing through a coil to produce a magnetic field. The magnetic field opposes the free flow of electricity through the coil, again converting electric energy into heat. Many other shunt circuits are well known in the electronic arts.

The electric potential gradient across the piezoelectric material 54 will change continuously as the component 52 and the attached piezoelectric material 54 cycle through a complete vibration. Preferably, an analysis of the piezoelectric material 54 as attached to a vibrating component 52, such as by finite element modeling, will reveal the configuration of the electric potential gradient across the piezoelectric material 54 as a function of the phase of the vibration. Such a model of the electric potential gradient will tend to indicate the best locations on the piezoelectric material 54 for attaching the ends of the shunt circuit 56 in response to a particular vibrational mode of the component 52.

It should be noted that the component 52 may be subject to more than one vibrational mode, for example a bending mode and a torsional mode, and consequently the piezoelectric material 54 may experience more than one induced electric potential gradient either sequentially or simultaneously. In order to damp more than one vibrational mode it may be necessary to employ more than one shunt circuit 56, with each shunt circuit 56 bridging a unique set of locations on the piezoelectric material 54.

In summary, the passive damping of the present invention reduces the intensity of a vibration of a component 52 of a data storage and retrieval system by using an attached piezoelectric material 54 to continuously convert mechanical energy into electrical potential energy. The electrical potential energy is further converted into an electric current flowing in a shunt circuit 56.

Active Damping

Figure 4:
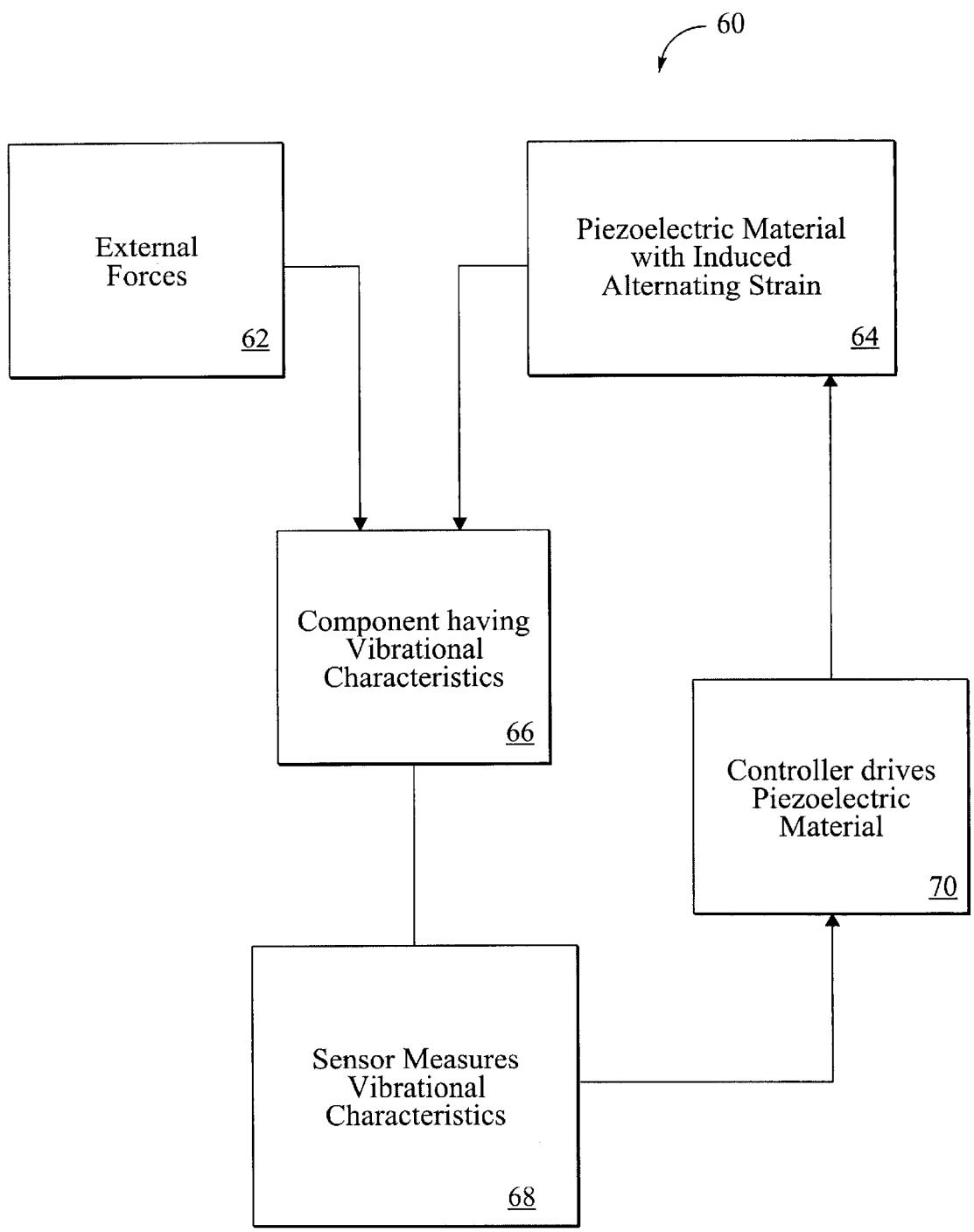
FIG. 4 is a process diagram of an active damping system.

FIG. 4 shows a schematic diagram illustrating an active damping system 60. The damping system 60 includes a component 66 of a data storage and retrieval system, a sensor 68, a controller 70, a piezoelectric material 64 attached to the component 66, and external forces 62 tending to induce unwanted vibrations in the component 66. As shown in FIG. 4, the system comprises a feedback loop. In the feedback loop both the external forces 62 and vibrations induced in the attached piezoelectric material 64 contribute to the overall vibrational state of the component 66. Ideally, the vibrations induced in the attached piezoelectric material 64 further induce canceling vibrations in the component 66 that are substantially the same as, but completely out of phase with, the vibrations induced in the component 66 by the external forces 62. In this ideal circumstance the externally induced vibrations and the canceling vibrations will substantially cancel each other and the component 66 will cease to vibrate. The feedback loop seeks to achieve this result by continuously monitoring the vibrations of the component 66 with the sensor 68 in communication with the controller 70 that drives the piezoelectric material 64 to induce the proper canceling vibrations in the component 66.

External Forces 62

External forces 62 refer to any source that may induce undesirable vibrations in a component 66. Such sources include, for example, moving parts of the data storage and retrieval system such as spinning disks and actuators. Other sources may include vibrations arising externally to the data storage and retrieval system that are transmitted to the component 66 through the enclosure 12. External sources 62 include continuous and occasional sources of excitations, as well as impulse excitations, e.g. shock.

Some external forces 62 occur predictably and reproducibly. For example, in a "seek phase" read/write head 24 is moved between tracks by introducing a current into the VCM. As this current increases read/write head 24 accelerates towards the desired track, and as the current decreases read/write head 24 decelerates to a stop. These acceleration and deceleration forces are examples of external forces 62 that predictably occur whenever read/write head 24 is moved and reproducibly follow a known pattern of increase and decrease.

Component 66

The vibrational state of the component 66 is the sum of all of the vibrational modes of the component 66, with each vibrational mode having three vibrational characteristics: a vibrational frequency, a vibrational amplitude, and a vibrational phase. Frequency is a measure of the length of time required to complete a full cycle of a vibration, whereas amplitude is a measure of the intensity of the vibration, and phase is an indicator of where the component 66 is, at a given moment in time, in the cycle of the vibration. Both external forces 62 and the canceling vibrations induced by the piezoelectric material 64 contribute to the vibrational state of component 66. Ideally, for every vibrational mode of the component 66 excited by external forces 62, there will be a corresponding canceling vibration induced by the piezoelectric material 64.

Preferably, a canceling vibration induced by the piezoelectric material 64 will have the same frequency and the same amplitude as a vibration caused by the external forces 62, but the two vibrations will have phases exactly 180° apart. In other words, the two vibrations should be identical but perfectly out of phase in order to achieve the best vibration reduction through destructive interference. However, less than perfect vibration reduction may be acceptable and may occur through various scenarios.

Sensor 68

A sensor 68 measures at least one vibrational characteristic of the component 66. In the present invention a sensor 68 may be a single device, or a combination of two or more different devices relying on the same or different measurement technologies to measure vibrational characteristics of one or more vibrational modes of the component 66.

One possible technology that may be employed to measure vibrational characteristics is an optical interferometer, as is well known in the art. Optical interferometers reflect a laser beam off of the object to be monitored and compare the reflected beam to a reference beam. The resulting interference pattern can reveal vibrational characteristics of the object. Another device well known in the art for measuring vibrational characteristics is a strain gauge. The strain gauge can be mounted on the component 66, and may generate an electric potential in response to strain. Such a strain gauge can be made, for example, of a piezoelectric material. Therefore, it may be possible for the piezoelectric material 64 in the present invention to serve both as the sensor 68 for measuring the vibrational characteristics of the component 66 as well as the device for generating canceling vibrations.

A third method for measuring vibrational characteristics of the component 66 in a data storage and retrieval system that utilizes a spinning magnetic or optical disk is to monitor an electric signal generated by reading data from the disk. In a magnetic disk drive, for example, the circuitry used to read data from the magnetic disk 16 is sometimes referred to as the magnetic read circuit. As data is read from a single track, the read/write head 24 senses the magnetic bits passing beneath it and converts the fluctuating magnetic field into electric signals. A vibration in the system may introduce a modulation into the electric signal produced by the magnetic read circuit. Analysis of the modulation may reveal the frequency, amplitude and phase of the vibration. Similarly, as the read/write head 24 is moved between tracks on a magnetic disk 16, the magnetic read circuit may read the passage of tracks beneath the read/write head 24 and an electric signal. Vibrations in the suspension 22, however, will modulate the electric signal, and that modulation may be analyzed to determine vibrational characteristics of the suspension 22.

Controller 70

A controller 70 in the present invention is in communication with the sensor 68 in order to receive information about the vibrational characteristics of at least one vibrational mode of the component 66. The controller 70 is configured to use this information to generate an alternating electric potential that can be applied to the piezoelectric material 64. The alternating electric potential generated by the controller 70 can be said to "drive" the piezoelectric material 64 because the applied alternating electric potential induces an alternating strain in the piezoelectric material 64. Since the piezoelectric material 64 is attached to the component 66, inducing an alternating strain in the piezoelectric material 64 will also induce an alternating strain in the component of the data storage and retrieval system.

The alternating strain induced in the piezoelectric material 64 will follow the alternating electric potential applied to it. For example, if the applied alternating electric potential from the controller 70 has a square waveform or a sawtooth waveform, the induced alternating strain in the piezoelectric material 64 will also have a square waveform or sawtooth waveform. More commonly, the sensor 68 will observe vibrations in the component 66 that have sinosoidal waveforms and will communicate the characteristics of the sinosoidal vibrations to the controller 70 that will drive the piezoelectric material 64 with a sinosoidal alternating electric potential to induce an alternating sinosoidal strain. An alternating sinosoidal strain may be thought of as analogous to a vibration. Although it is anticipated that most vibrations in a component 66 induced by external forces 62 will follow sinosoidal waveforms, embodiments of the present invention are capable of sensing non-sinosoidal vibrations, and the controller 70 may be capable of generating non-sinosoidal alternating electric potentials in response thereto.

The frequency of the alternating strain induced in the piezoelectric material 64 should be substantially the same as the frequency of the alternating electric potential applied to it. The phase of the alternating strain in the piezoelectric material 64, however, will likely lag behind the phase of the alternating electric potential from the controller 70. This is because it takes a finite amount of time for the piezoelectric material 64 to respond with a dimensional change to an applied voltage. A similar phase lag is likely to occur between the alternating strain in the piezoelectric material 64 and the induced canceling vibration in the component 66.

Consequently, a further objective of the controller 70 is to control the feedback loop by monitoring the output of the sensor 68 in response to the alternating electric potential it applies to the piezoelectric material 64. To optimize vibration damping, it may be necessary for the controller 70 to advance the phase of the applied alternating electric potential to account for the various phase lags inherent in the system.

It should also be noted that where the sensor 68 measures more than one vibrational mode, the controller 70 may be able to generate a complex alternating electric potential to be applied to the piezoelectric material 64. The complex alternating electric potential may take several forms. In one form, the complex alternating electric potential would be the summation of more than one waveform that would be applied between two locations on the piezoelectric material 64 to induce a complex vibration in the component 66. In another form, the complex alternating electric potential may be a plurality of separate alternating electric potentials applied between a plurality of sets of locations on the piezoelectric material 64. In a further form, the complex alternating electric potential could be a plurality of separate alternating electric potentials applied to a plurality of separate piezoelectric materials 64 on the same component 66.

Still another use of controller 70 is to anticipate vibrations and to proactively counteract them as they arise. Such a controller 70 is said to operate in a feedforward mode, in contrast to the feedback modes discussed above. Feedforward operation is possible where external forces 62 occur predictably and reproducibly, such as in the seek phase described above. In such an embodiment the controller 70 receives, for example, input from sensor 68 configured to monitor the current applied to the VCM. The controller 70, knowing how the external forces 62 vary as a function of the applied current, can anticipate the motion of the read/write head 24 and apply an electric potential proactively to piezoelectric material 64. In this way the read/write head 24 can be brought to a faster stop over the desired track, thus reducing seek time. Such an "active braking" system might, for example, be turned off by the controller 70 through the acceleration phase and part of the deceleration phase of the seek, and only be activated near the end of the seek. Turning off the vibration damping during the majority of the seek, when damping provides no particular advantage, would have the further advantage of saving energy.

Piezoelectric Material 64

As previously noted, the piezoelectric material 64 may take any number of forms, but preferably will be thin and will cover a suitable area of the component 66 to be effective. Further, an analysis of the component 66, such as a finite element modeling, may reveal the most likely vibrational modes for the component 66, which can suggest both a shape for the piezoelectric material 64 and where it should be attached for optimal damping.

The induced alternating strain in the piezoelectric material 64 may induce a canceling vibration in component 66, where both the induced alternating strain and the canceling vibration are coupled because the piezoelectric material 64 and the component 66 are well attached to one another. It should be noted that the induced alternating strain in the piezoelectric material 64 should induce a canceling vibration in the component 66 that has substantially the same frequency as the frequency of the alternating strain in the piezoelectric material 64. It is likely, however, that the phase of the canceling vibration will lag behind the phase of the alternating strain by a small amount, sometimes referred to as latency. As noted previously, one function of the controller 70 is to adjust its output to the piezoelectric material 64 is response to the input it is receiving from the sensor 68. In this way the controller 70 can sufficiently advance the phase of the alternating electric potential applied to the piezoelectric material 64 such that phase of the canceling vibration in the component 66 is substantially different from, and preferably 180° out of phase with, the phase of the vibration induced by the external forces 62.

Figure 5A:
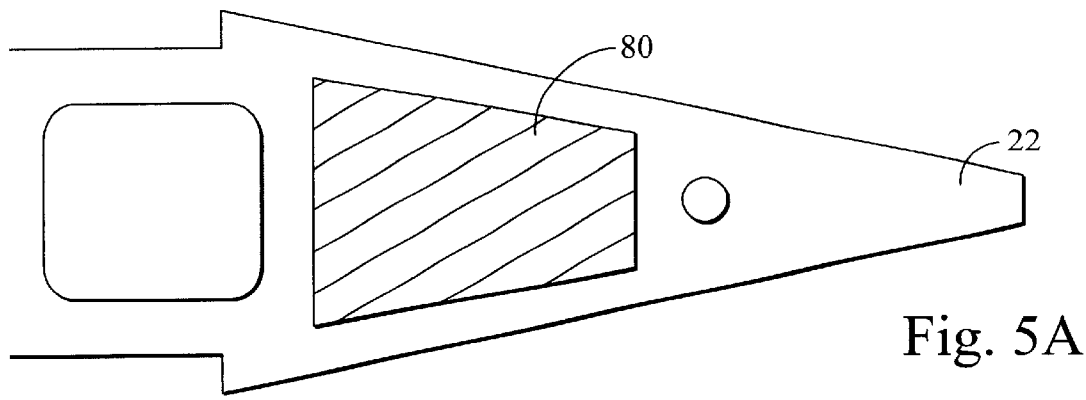
FIGS. 5A–5C are top plan views of various locations for the placement of piezoelectric materials on a read/write head suspension.
Figure 5B:
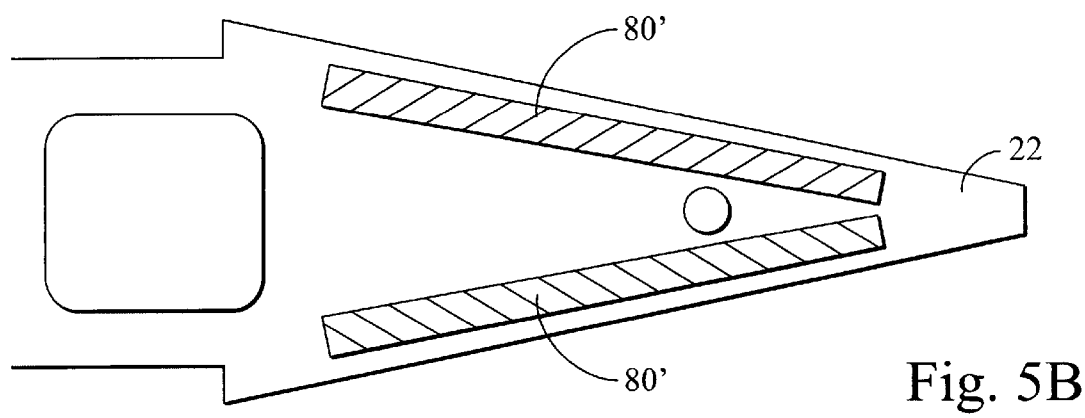
Figure 5C:
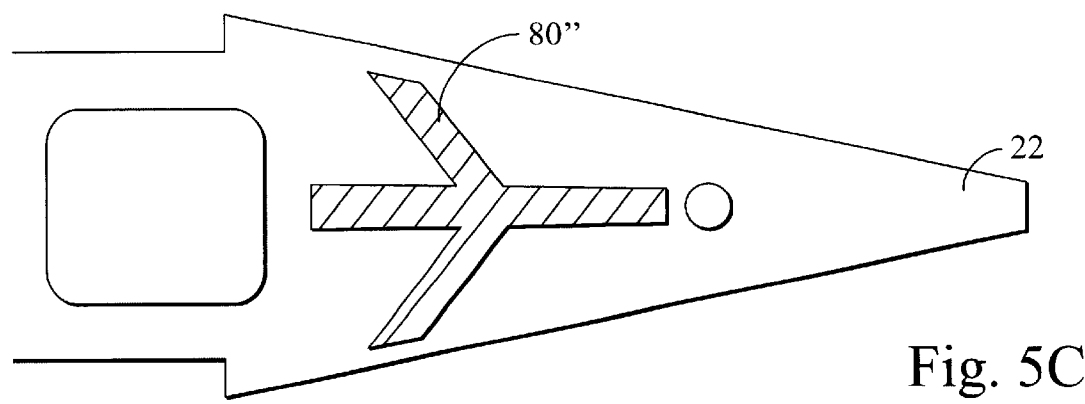

FIGS. 5A–5C are top plan views of example locations for patches of piezoelectric materials 80 on a read/write head suspension 22. While these drawings happen to be specific to a read/write head suspension 22, the concepts are equally applicable to other components of data storage and retrieval systems.

FIG. 5A illustrates a basic shape and location for a piezoelectric material on a read/write head suspension 22. The shape and location are similar to those of prior art viscoelastic dampers. In a passive damping system more than one electrical shunt (not shown) may be connected to the piezoelectric material 80, with each shunt bridging two separate locations to counteract a plurality of common vibrational modes. Likewise, in an active damping system, one or more controllers (not shown) may apply alternating electric potentials between more than one set of locations on the piezoelectric material 80. For instance, one set of locations may include points on the top and bottom surfaces of the piezoelectric material 80, another set may include points on the distal and proximal ends of the piezoelectric material 80, and a third set may include points on the left and right sides of piezoelectric material 80.

FIG. 5B illustrates the possibility of mounting more than one patch of a piezoelectric material 80' onto a suspension 22. Multiple patches may be used to address different vibrational modes, or they may act in unison against a single vibrational mode. The design in FIG. 5B, for example, could be very effective in damping torsional vibrations where the two patches of piezoelectric material 80' are acting in unison.

FIG. 5C shows a piezoelectric material 80" with a complex shape attached to a suspension 22. Such a complex shape may be a more effective method for addressing multiple vibrational modes in a single component. As previously noted, one or more controllers (not shown) may apply one or more alternating electric potentials to a plurality of separate sets of locations on a piezoelectric material 80".

Although the foregoing invention has been described in some detail for purposes of clarity of understanding, it will be apparent that certain changes and modifications may be practiced within the scope of the appended claims.

Accordingly, the present embodiments are to be considered as illustrative and not restrictive, and the invention is not to be limited to the details given herein, but may be modified within the scope and equivalents of the appended claims.

What is claimed is:

1. An active vibration damping device, comprising:
   a component of a data storage and retrieval system, said component being subject to vibration;
   a piezoelectric material fixedly attached to said component of said data storage and retrieval system;
   a sensor for measuring a vibrational characteristic of at least one vibrational mode of said component of said data storage and retrieval system; and
   a controller in communication with said sensor, wherein said controller is configured to operate in a feedforward mode to apply an electric potential to said piezoelectric material to counteract a predictable vibration of said component.

2. The vibration damping device of claim 1, wherein said vibrational characteristic is one or more of the group consisting of a vibrational frequency, a vibrational amplitude, and a vibrational phase.

3. The vibration damping device of claim 2, wherein a frequency of said alternating electric potential applied to said piezoelectric material is substantially equal to said vibrational frequency of at least one vibrational mode of said component of said data storage and retrieval system; and
   said alternating electric potential applied to said piezoelectric material has a phase that is substantially different from said vibrational phase of said at least one vibrational mode of said component of said data storage and retrieval system.

4. The vibration damping device of claim 3, wherein said alternating electric potential applied to said piezoelectric material is appropriate to induce a canceling vibration in said component of said data storage and retrieval system, said canceling vibration having a phase essentially 180° out of phase with said vibrational phase of at least one vibrational mode of said component of said data storage and retrieval system.

5. The vibration damping device of claim 4, wherein said canceling vibration has a frequency substantially the same as said vibrational frequency of at least one vibrational mode of said component of said data storage and retrieval system, and said canceling vibration has an amplitude substantially the same as said vibrational amplitude of at least one vibrational mode of said component of said data storage and retrieval system.

6. The vibration damping device of claim 1, wherein said component of said data storage and retrieval system is a component of a magnetic disk drive.

7. The vibration damping device of claim 1, wherein said component of said data storage and retrieval system is a component of an optical disk drive.

8. The vibration damping device of claim 1, wherein said component of said data storage and retrieval system is one of the group consisting of an actuator arm, a slider suspension, and a VCM.

9. The vibration damping device of claim 1, wherein said piezoelectric material is selected from the group comprising lead zirconium titanate (PZT) and polyvinylidene fluoride (PVDF).

10. The vibration damping device of claim 1, wherein said sensor is one of the group consisting of a laser interferometer, a strain gauge, and a magnetic read circuit.

11. The vibration damping device of claim 1, wherein said component is a suspension and said predictable vibration occurs during a settling time.

* * * * *